United States Patent [19]

Olafson

[11] 4,075,779
[45] Feb. 28, 1978

[54] CRAB POT

[76] Inventor: Theodore T. Olafson, Box 251, Kodiak, Ak.

[21] Appl. No.: 697,880

[22] Filed: Jun. 21, 1976

[51] Int. Cl.² ............................................. A01K 69/08
[52] U.S. Cl. ...................................................... 43/100
[58] Field of Search ........................... 43/100, 102, 105

[56] References Cited

U.S. PATENT DOCUMENTS

| | | | |
|---|---|---|---|
| 2,516,658 | 7/1950 | Stelly | 43/100 |
| 3,184,881 | 5/1965 | Jatzeck | 43/102 |
| 3,373,523 | 3/1968 | Olafson | 43/100 |
| 3,795,073 | 3/1974 | Olsen | 43/105 |

Primary Examiner—Warner H. Camp
Attorney, Agent, or Firm—Christopher Duffy

[57] ABSTRACT

The crab trap is a multi-component trap adapted to be stripped down to its respective components for storage. It comprises spaced top and bottom closure members and posts detachably interposed therebetween to form an open-sided cage. Normally open crab entry means are attached to the cage adjacent the openings on opposite sides thereof, and normally-closed operator entry means are attached to the cage adjacent a remaining side opening thereof. Any additional side openings are also closed to the outward movement of crabs, so that crabs entering the cage through the crab entry means, remain trapped therein. However, the crab entry means, the operator entry means, and the additional closure means, if any, are all removable from the openings thereadjacent in the cage, so that when the trap is out of use and the posts are detached from the top and bottom closure members, the members can be stacked on top of one another in a pile.

15 Claims, 8 Drawing Figures

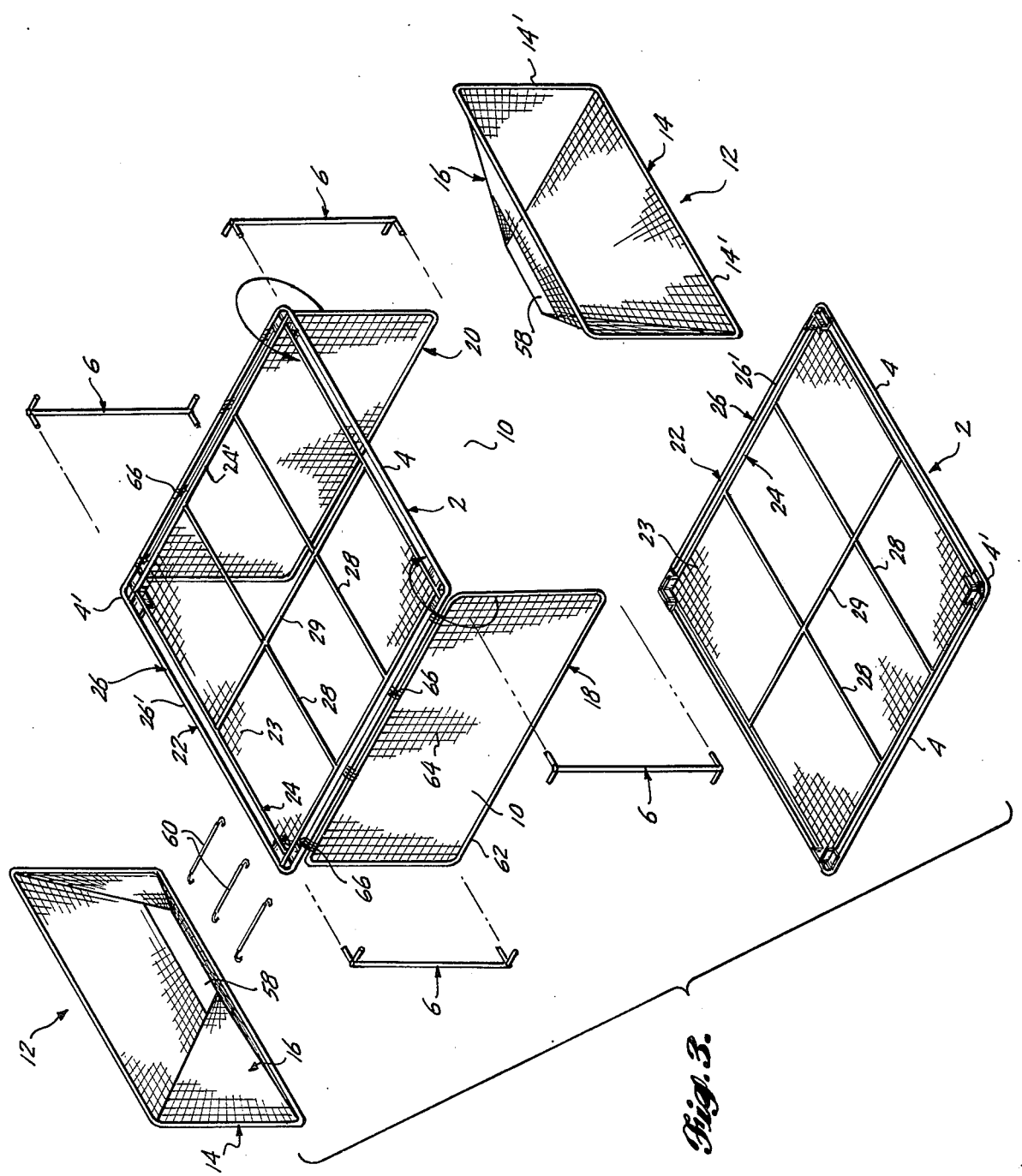

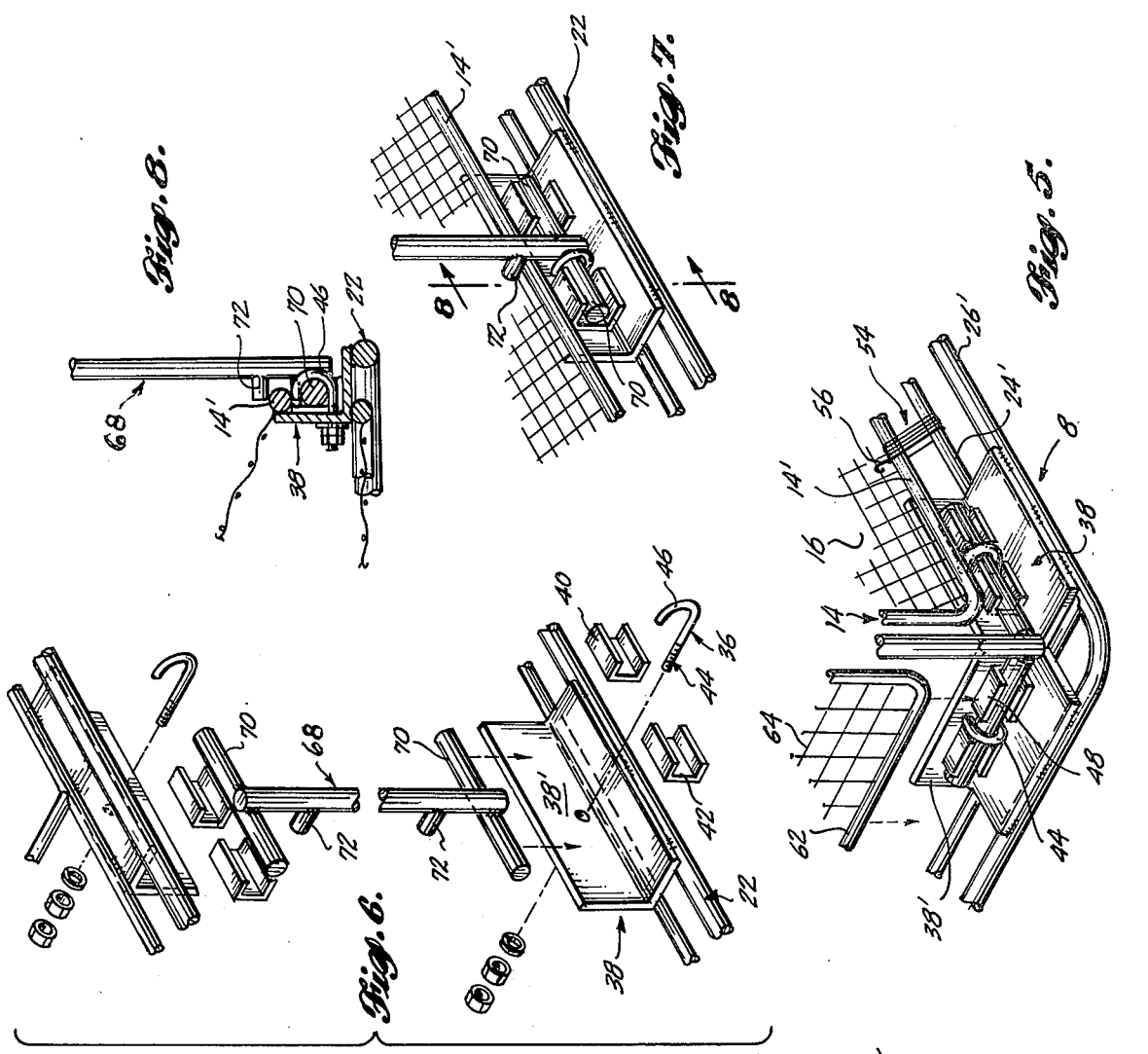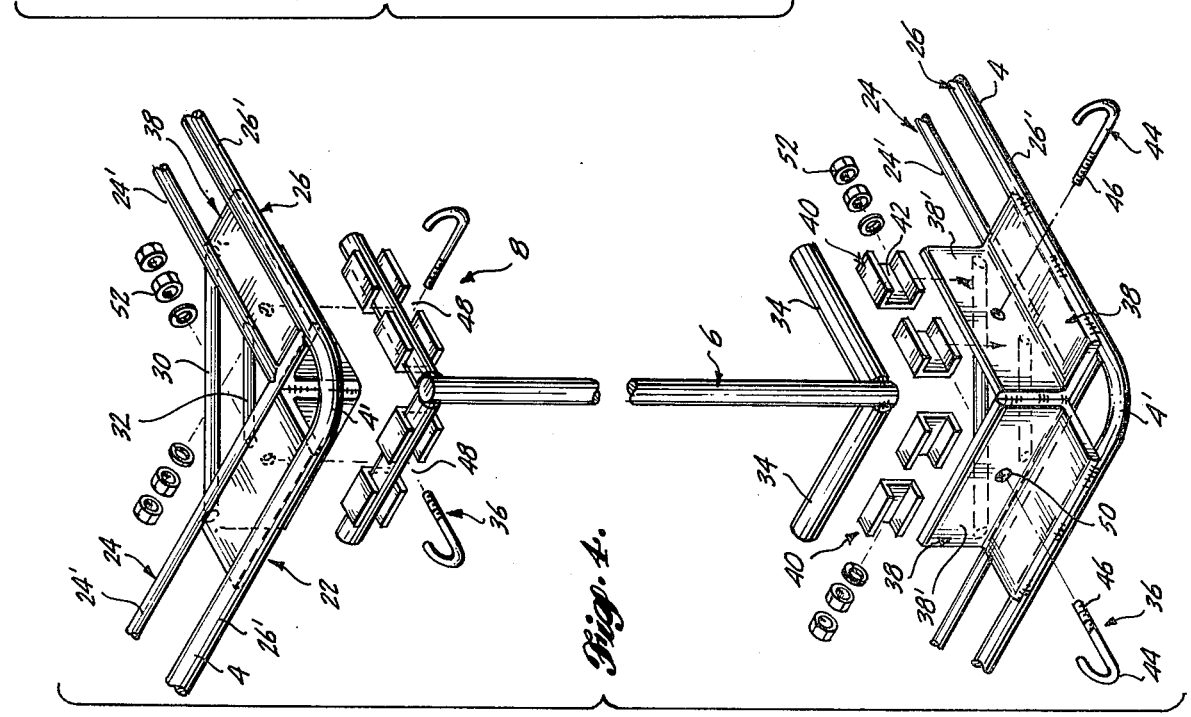

CRAB POT

THE INVENTION IN GENERAL

This invention relates to a crab trap, and in particular, to a multi-component crab trap adapted to be stripped down to its respective components for storage.

The trap comprises a pair of spaced closure members which are superposed over one another with corresponding edges thereof oriented in substantially the same directions. The closure members have spaced posts removably interposed therebetween at symmetrically arrayed sites adjacent corresponding edge portions of the members, and there are means detachably interconnecting each post with the adjacent edge portions of the respective members, to integrate the posts and members in the form of a cage having openings about the sides thereof in the spaces between the members and the posts. Normally-open crab entry means including tunnel rings are attached to the cage adjacent openings on opposite sides of the cage, and the tunnel rings have relatively inclined entry tunnels extending therebetween within the cage, which open into the interior of the cage. Also, normally-closed operator entry means are attached to the cage adjacent one of the remaining openings in the same, and additional closure means are attached to the cage adjacent the balance of the openings, to close the periphery of the cage to the movement of crabs, so that crabs entering the cage through the tunnels, remain trapped therein. However, the crab entry means, operator entry means, and closure means, are removably interposed in the spaces between the members and the posts, so that on detaching the posts from the members, and removing the crab entry means, operator means, and closure means, the members can be stacked on top of one another in a pile.

The cage may take many forms; however, in a presently preferred embodiment, the closure members are quadrilateral in outline and the posts are interposed between the members, adjacent corresponding corner portions thereof. Also, the members comprise open faced frames which are disposed at the edges of the members and have netting strung across the openings in the faces thereof. The frames are substantially the same size in outline, and may comprise pairs of spaced, concentric subframes, the respective framing members of which are co-parallel and interconnected with one another at the corners of the frame, for example by virtue of the framing members of the relatively inner frame being extended to make contact with the corner portions of the outer frame, and welds or the like being used to secure the inner framing members to the outer frame at the points of contact.

The posts may be interconnected with the adjacent corner portions of the closure members in a variety of ways; however, in the aforementioned embodiment, the posts have pairs of angularly spaced arms thereon, adjacent the respective ends thereof, and the arms extend substantially on parallels to the framing members of the respective frames, at the respective corners of the frames, there being releasable clamping means interconnected with the respective arms and framing members on the opposite sides of the posts, to integrate the posts and frames in the form of a cage. The latter means may take the form of groove defining means on the frames, the grooves of which are adapted to receive the arms of the posts therein, and fastening elements which are reciprocably mounted on the frames in association with the groove defining means, to be advanced and retracted with respect to the grooves, to clamp the arms in the grooves, and alternatively, release the arms from the same.

As indicated, the crab entry means are removably interposed in their respective spaces between the members and the posts. Preferably, the tunnel rings are detachably connected to the cage and the tunnels are connected to the tunnel rings, so that on detaching the tunnel rings from the cage, the crab entry means can be removed from the same. The tunnel rings may be detachably connected by means of rubber hooks or the like, or other fastening means may be employed for this purpose.

The posts may also be employed to detachably interconnect the tunnel rings to the cage. For example, the tunnel rings may be clamped between the posts and the frames of the closure members to achieve this end. Ordinarily, however, posts which have this clamping function are additional to those used to form the cage. For example, clamping posts may be interposed between the corner posts of a quadrilateral cage, adjacent the midway points on the sides of the cage. In such a case, they would normally also function as stiffeners with which to rigidify the cage.

Preferably, the additional closure means also take the form of operator entry means. For example, in the case of a quadrilateral cage, there may be operator entry means adjacent the openings on both of the other pair of opposing sides of the cage. Also, the entry means preferably take the form of doors which are hinged to the frame of one closure member and swung outwardly from the adjacent openings of the cage to enable an operator to gain entry to the cage on either side thereof. During use, however, the doors are normally closed and secured to the cage, again using rubber hooks or the like for the purpose.

Preferably, the doors swing into an overlying condition with respect to the adjoining closure member, so that the doors can be interwoven with the closure members in a storage pile of the same.

BRIEF DESCRIPTION OF THE DRAWINGS

These features will be better understood by reference to the accompanying drawings which illustrate the aforementioned presently preferred embodiment of the invention.

In the drawings,

FIG. 3 is an exploded part perspective view of the trap when it is disassembled.

FIG. 4 is an exploded part perspective view of one corner of the trap, illustrating the post connection made at each corner;

FIG. 5 is a part perspective view of the bottom half of the corner seen in FIG. 4, after the trap is reassembled;

FIG. 6 is an exploded part perspective view of a stiffener post assembly;

FIG. 7 is a part perspective view of the bottom half of the stiffener post assembly when the trap is assembled; and FIG. 8 is a part cross-sectional view along the line 8—8 of FIG. 7.

DESCRIPTION OF THE PREFERRED EMOBDIMENT

Figure 1:
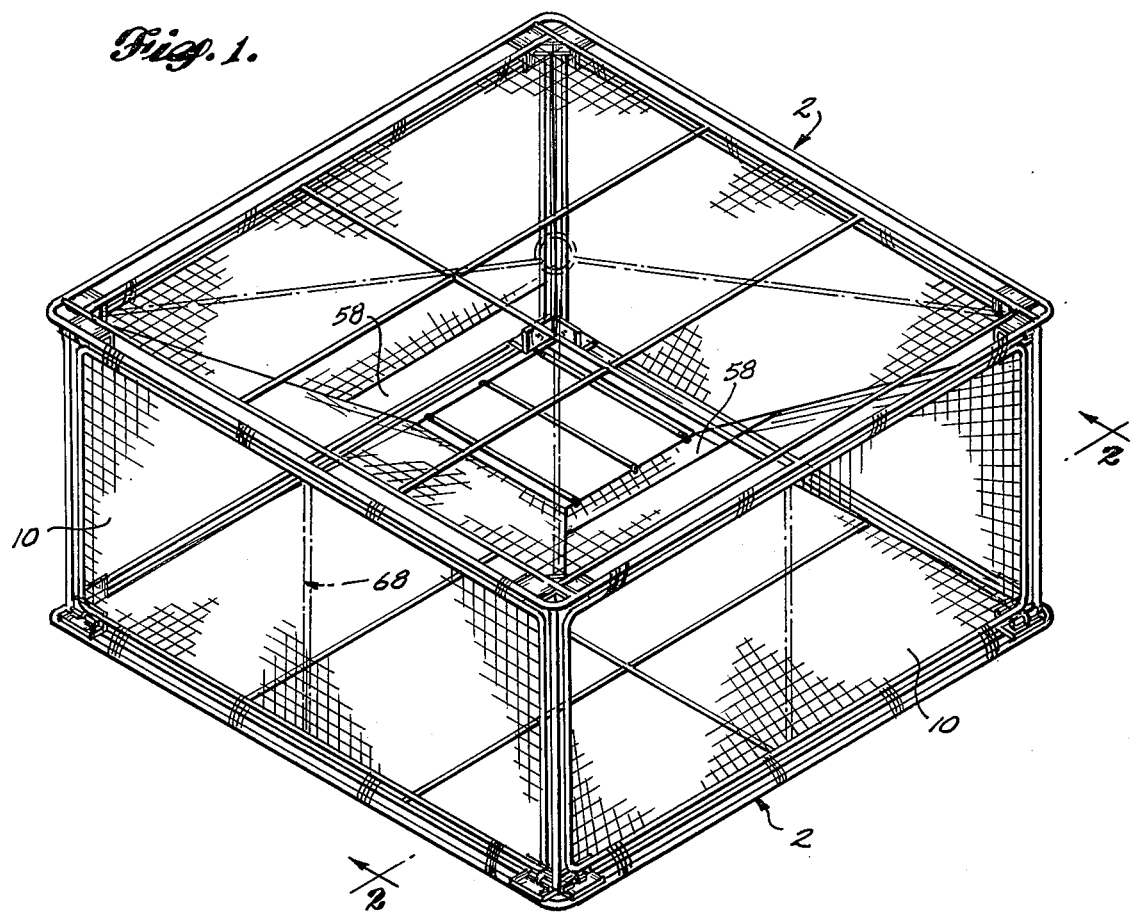
FIG. 1 is a perspective view of an assembled trap.
Figure 2:
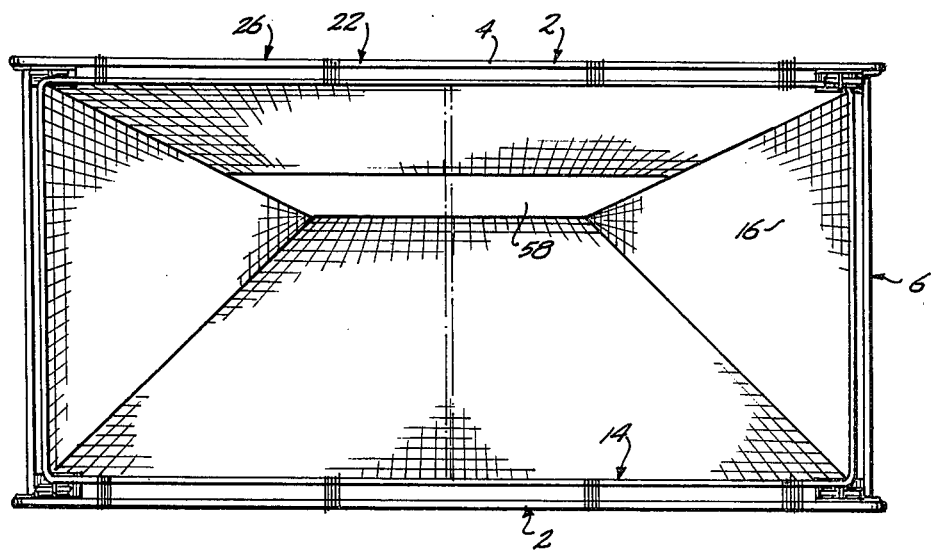
FIG. 2 is a side elevational view of the trap along the line 2—2 of FIG. 1.

Referring to the drawings, it will be seen that the crab trap comprises a pair of spaced closure members 2 (FIG. 3) which are superposed over one another with the corresponding edges 4 thereof oriented in substantially the same directions. The closure members have spaced posts 6 removably interposed therebetween at symmetrically arrayed sites adjacent corresponding portions 4' of their edges. In addition, there are means 8 (FIGS. 4 and 5) detachably interconnecting each post 6 with the adjacent edge portions 4' of the respective members, to integrate the posts and members in the form of a cage having openings 10 about the sides thereof in the spaces between the members 2 and the posts 6. Normally-open crab entry means 12 (FIG. 3), including a pair of tunnel rings 14, are attached to the cage adjacent openings on opposite sides of the cage. The tunnel rings have relatively inclined entry tunnels 16 of netting extending therebetween within the cage, which open into the interior of the cage. Also, normally-closed operator entry means 18 (FIG. 3) are attached to the cage adjacent one of the remaining openings in the same, and closure means 20 (FIG. 3) are attached to the cage adjacent the balance of the openings, to close the periphery of the cage to the movement of crabs, so that crabs entering the cage through the tunnels, remain trapped therein in known manner. However, the crab entry means 12, operator entry means 18, and closure means 20, are removably interposed in the spaces between the members 2 and the posts 6, so that on detaching the posts from the members, and removing the crab entry means, operator entry means, and closure means, the members 2 can be stacked on top of one another in a pile.

As indicated earlier, the cage may take many forms. However, in the illustrated embodiment, the closure members 2 are quadrilateral in outline and the posts 6 are interposed between the members, adjacent corresponding corner portions 4' thereof. Also, the members comprise open-faced frames 22 which are disposed at the edges 4 of the members and have netting 23 strung across the openings in the faces thereof. The frames 22 are substantially the same size in outline, and comprise pairs of spaced, concentric sub-frames 24 and 26, the respective framing members 24' and 26' of which are co-parallel and interconnected with one another at the corners of the frame, by virtue of the framing members 24' of the relatively inner frame 24 being extended to make contact with the corner portions of the outer frame 26, where welds or the like are used to secure the members 24' to the frame 26.

Preferably, the closure members 2 also include a plurality of cross bars 28 and 29 which are arrayed within the inner sub-frames 24 to stiffen and rigidity the respective closure members. In the illustrated embodiment, there are three cross bars 28 and 29 on each member, two of which, 28, are co-parallel and co-centered in spaced relationship to one another in one axial direction of the closure member, and the other of which, 29, is centered along the other axis of the member and, of course, on a perpendicular to the first two cross bars 28. See FIG. 3 in particular.

Additionally, the closure members 2 include pairs of collar members 30 and 32 (FIG. 4) which are secured to the adjoining framing members 24' of the inner sub-frames 24 in the corners thereof. The netting 23 is secured to the longer collar members 30, and to the framing members 24' of the inner sub-frames 24. The shorter collar members 32 provide attachment points for the bridle of a crane (not shown), when the relatively top member 2 and/or the trap is lifted in use, as shall be explained.

As also mentioned earlier, the posts 6 may be interconnected with the adjacent corner portions 4' of the closure members 2 in a variety of ways. However, in the illustrated embodiment, the posts have pairs of angularly spaced arms 34 thereon, adjacent the respective ends thereof, and the arms extend substantially on parallels to the framing members 24' and 26' of the respective frames 22, at the respective corners 4' of the frames. Moreover, releasable clamping means 36 are interconnected with the respective arms and frames on the opposite sides of the posts, to integrate the posts and frames in the form of a cage. The frames 22 have short lengths of angle iron 38 welded to the tops and bottoms of the same, across the spaces between sub-frames; and the relatively upright and depending legs 38' of the angle irons have still shorter and narrower lengths of channel iron 40 welded to the outwardly oriented faces thereof, to form grooves 42 on the frames which are adapted to receive the arms of the posts therein. The channel irons are welded in spaced pairs on the angle irons, and fastening elements in the form of hooks 44 with threaded shanks 46, are reciprocably mounted on the angle irons in the slots 48 between pairs of channel irons, to be advanced and retracted with respect to the grooves, to clamp the arms in the grooves, and alternatively, release the arms from the same. Compare FIGS. 4 and 5. Note that the relatively upright and depending legs 38' of the angle irons 38 have holes 50 in the same, intermediate the pairs of channel irons 40, and that the shanks 46 of the hooks are passed through the holes, from points on the outside of the cage, and nuts 52 are threaded onto the shanks of the hooks, from points on the inside of the cage, to draw up the hooks and secure them against the corresponding legs 34 of the posts, in the slots 48 between the pairs of channel irons.

The tunnel rings 14 are also quadrilateral in outline, but are sized to fit within the openings 10 between the closure members 2 and the posts 6 on their respective sides of the cage. They are also sized to abut the outwardly oriented faces of the legs 38' of the angle irons, at points above and below the respective pairs of channel irons 40 on the same, so that the irons 38 and 40 form right angular indexing abutments for the rings on the cage. Rubber loops 54 with hooks 56 on the ends of the same, are then passed about the horizontal framing members 14' of the rings, and the framing members 24' of the sub-frames 24', in known fashion, to detachably secure the rings to the cage. Similar rubber hooks may also be employed between the vertical members 14' of the rings and the posts 6 if desired; and in fact, other fastening means may be employed to secure the rings to the cage in lieu of the hooks, if desired.

As indicated, the tunnel rings 14 have relatively inclined entry tunnels 16 of netting extending therebetween within the cage, and the tunnels open into the interior of the cage at the so-called "eyes" 58 (FIG. 3) thereof. Ties 60 are stretched between the tops of the eyes to sustain the tunnels in known fashion, and the crab entry means is also otherwise conventional in nature, so that crabs can enter the cage and spill over into the bottom of the cage through the eyes of the tunnels in known fashion.

The operator entry means 18 and closure means 20 both take the form of door-like, open-faced frames 62 having netting 64 strung across the openings in the faces thereof. The frames 64 are hinged to the framing members 26' of the sub-frame 26 of the top closure member 2, using nylon cord 66 (FIG. 3) to form the hinges therebetween; and the frames 64 are swung upwardly to remove them from the adjacent openings 10 when an operator desires to gain entry to the cage. Of course, this is normally done only when the operator chooses to remove one or more crabs from the cage, and the operator entry means are normally otherwise closed and secured to the cage, again using rubber hooks 54, 56 or the like between the frames and the framing members 26' of the sub-frame 26 of the bottom closure member 2.

The trap is typically 6 feet square or greater in size. Where the trap is 7 feet square or more in size, stiffener posts 68 are added to the sides of the cage, midway of the framing members 24' and 26'. Referring to FIGS. 6–8, it will be seen that the stiffener posts 68 have pairs of co-parallel cross arms 70 thereon adjacent the respective ends thereof, and the arms 70 extend substantially on parallels to the framing members at the midway points thereof. Releasable clamping means 36 are interconnected with the respective arms and framing members, on the opposite sides of the posts 68, to secure the posts to the cage. The frames 22 have short lengths of angle iron 38 welded to the tops and bottoms of the same, across the spaces between sub-frames; and the upright and depending legs 38' of the angle irons have still shorter lengths of channel iron 40 welded to the outwardly oriented faces thereof, to form grooves 42 on the frames which are adapted to receive the arms 70 of the posts 68 therein. As in the case of the corner post assemblies, the channel irons are welded in spaced pairs on the angle irons, and fastening elements in the form of hooks 44 with threaded shanks 46, are reciprocably mounted on the angle irons in the slots between pairs of channel irons, to releasably clamp the arms 70 in the grooves 42.

The stiffener posts 68 may also be employed to releasably secure the crab entry means 12 to the cage. The posts 68 have studs 72 projecting right angularly from the same, inwardly of the cage, to enable the framing members 14' of the tunnel rings 14 to be clamped to the cage when the posts 68 are engaged and clamped in the grooves 42. See FIGS. 7 and 8 wherein the adjacent framing member 14' of the adjacent tunnel ring 14 is clamped against the tops of the channel irons 40, between the face of the leg 38' of the angle iron 38 and the post 68.

It should be apparent that once the corner posts 6 are detached from the members 2, and the crab entry means 12, operator entry means 18, stiffener posts 68, and closure means 20, are removed from their respective openings 10, the closure members 2 can be stacked on one another in a pile. See FIG. 3 wherein all of the respective posts and means are removed from the closure members 2 to enable the members to be so stacked. Note also that the operator entry means 18 are removed, and then swung further into a overlying condition on the top closure member 2, the member 2 being sized so that the frames 62 can nest on top of the member, to either side of the cross bar 29 of the closure member.

The posts 6 and 68 are a fungible item and are normally stored on the trap-carrying vessel by tossing them in a heap in the hold of the same, or on the deck of the vessel. The crab entry means 12 may be similarly stored, since again they are a universal, modular and fungible item. As indicated, however, the closure members 2, and accompanying operator entry means 18, (and 20) are normally stacked on top of one another, and in practice the stacks of several traps are collected in a common stack, normally on the deck of the vessel.

At the time of use, a crane or the like is swung over the stack of closure members 2 and each top closure member is lifted, while four posts 6 are inserted between it and its corresponding bottom closure member, and the hooks 44 are secured to form a cage. Then the crab entry means 12 are added, using either rubber hooks 54 and/or the stiffener posts 68 to secure the tunnel rings 14 of the same to the cage; and ultimately, the completed trap is lifted and swung over the side of the vessel to be put into use.

If desired, the tunnel rings can be slightly larger, the corners of the tunnel rings 14 can be notched, and the rings can be clamped against the irons 38 at the notches so as to provide s snugger fit between the horizontal framing members 14' of the rings and the frames 22. Likewise, other changes and additions can be made in and to the illustrated embodiment without departing from the scope and spirit of the invention as defined in the accompanying claims.

What is claimed is:

1. A multi-component crab trap adapted to be stripped down to its respective components for storage, comprising a pair of spaced quadrilateral closure members which are superposed over one another with corresponding edges thereof oriented in substantially the same directions, and have spaced posts removably interposed therebetween, adjacent corresponding corner portions thereof, said posts having pairs of angularly spaced arms thereon, adjacent the respective ends thereof, and said arms extending substantially on parallels to the edges of the closure members at the respective corners thereof, and there being releasable clamping means interconnected with the respective arms and closure members on opposite sides of the posts to integrate the posts and closure members in the form of a cage having openings about the sides thereof in the spaces between the members and the posts, normally open crab entry means including tunnel rings attached to the cage adjacent openings on opposite sides of the cage, and having relatively inclined entry tunnels extending therebetween within the cage, which open into the interior of the cage, normally closed operator entry means attached to the cage adjacent one of the remaining openings in the same, and closure means attached to the cage adjacent the balance of the openings, to close the periphery of the cage to the movement of crabs, so that crabs entering the cage through the tunnels, remain trapped therein, the crab entry means, operator entry means, and closure means, being removably interposed in the spaces between the members and the posts, so that on detaching the posts from the members, and removing the crab entry means, operator entry means, and closure means, the members can be stacked on top of one another in a pile.

2. The crab trap according to claim 1 wherein the members comprise open-faced frames which are disposed at the edges of the members and have netting strung across the openings in the faces thereof.

3. The crab trap according to claim 2 wherein the frames are substantially the same size in outline and comprise pairs of spaced, concentric sub-frames, the respective framing members of which are co-parallel and interconnected with one another at the corners of the frame.

4. The crab trap according to claim 2 wherein the releasable clamping means takes the form of groove defining means on the frames, the grooves of which are adapted to receive the arms of the posts therein, and fastening elements which are reciprocably mounted on the frames in association with the groove defining means, to be advanced and retracted with respect to the grooves, to clamp the arms in the grooves, and alternatively, release the arms from the same.

5. The crab trap according to claim 2 wherein the tunnel rings are detachably connected to the cage and the tunnels are connected to the tunnel rings, so that on detaching the tunnel rings from the cage, the crab entry means can be removed from the same.

6. The crab trap according to claim 5 wherein the tunnel rings are detachably connected to the cage by rubber hooks or the like.

7. The crab trap according to claim 5 wherein the tunnel rings are detachably connected to the cage by clamping the same between the posts and the frames of the closure members.

8. The crab trap according to claim 5 wherein there are additional posts interposed in the spaces between the first mentioned posts, and the tunnel rings are detachably connected to the cage by clamping the same between the additional posts and the frames of the closure members.

9. The crab trap according to claim 1 wherein the closure means take the form of additional operator entry means.

10. The crab trap according to claim 9 wherein the operator entry means take the form of doors which are hinged to the frame of one closure member to be swung outwardly from the adjacent openings of the cage to enable an operator to gain entry to the same through the openings.

11. The crab trap according to claim 10 wherein the doors are swingable into an overlying condition with respect to the adjoining closure member, so that the doors can be interwoven with the closure members in a storage pile of the same.

12. A multi-component crab trap adapted to be stripped down to its respective components for storage, comprising spaced, relatively superposed top and bottom closure members, spaced, generally upright posts removably interposed in the space between the closure members to form a cage having side openings coinciding and co-extensive with the spaces between the respective pairs of posts and the top and bottom closure members, and a quadrilateral frame disposed in each of the respective side openings of the cage, said frames being equipped with means for closing the openings to the outward movement of crabs, but said closure means including normally open means for entry of the crabs into the cage and normally closed means for entry of an operator into the cage, so that crabs entering the cage through the crab entry means remain trapped therein, but can be subsequently removed through the operator entry means, said posts being arrayed about the cage on all sides thereof and rigidly connected to the closure members between the frames so as to support the cage in upright rigid condition separately and independently of the frames, said frames being connected to the cage within the perimeters of the respective side openings thereof so as to be removable from the respective openings, and said rigid connections between the posts and the closure members being detachably constructed whereby when the trap is out of use, the frames can be removed from the openings thereadjacent and thereafter the posts can be detached from the closure members and removed from the space therebetween to enable the members to be stacked on top of one another in a pile.

13. The crab trap according to claim 12 wherein the frames are connected to the closure members separately and independently of the posts.

14. The crab trap according to claim 12 wherein the posts have laterally projecting attachment means on the end portions thereof, and there are detachably constructed means for rigidly interconnecting the attachment means with the respective top and bottom closure members to form the cage.

15. A kit for assemblying a crab trap comprising a pair of closure members which are adapted to be superposed over one another with a space therebetween, set of posts which are adapted to be removably interposed generally upright in the space between the closure members, with spaces therebetween, and which have attachment means on the end portions thereof, connecting means for rigidly interconnecting the attachment means of the posts with the respective closure members to integrate the posts and members in the form of a cage having side openings coinciding and co-extensive with the spaces between the respective pairs of posts and the top and bottom closure members, a plurality of quadrilateral frames, each of which is adapted to be disposed in one of the side openings of the cage, said frames being equipped with means for closing the openings to the outward movement of crabs, but said closure means including normally open means for entry of the crabs into the cage and normally closed means for entry of an operator into the cage, so that crabs entering the cage through the crab entry means remain trapped therein, but can be subsequently removed through the operator entry means, said connecting means including connecting elements which are disposed on the closure members to array the posts about the cage on all sides thereof and thereby support the cage in upright rigid condition separately and independently of the frames, said frames being adapted to be connected to the cage within the perimeters of the respective side openings thereof so as to be removable from the respective openings and said connecting means being detachably constructed whereby when the trap is out of use, the frames can be removed from the openings thereadjacent and thereafter the posts can be detached from the closure members and removed from the space therebetween to enable the members to be stacked on top of one another in a pile.

* * * * *